Nov. 2, 1937.  C. E. McEWEN  2,097,986
FISH LURE
Filed Oct. 19, 1936
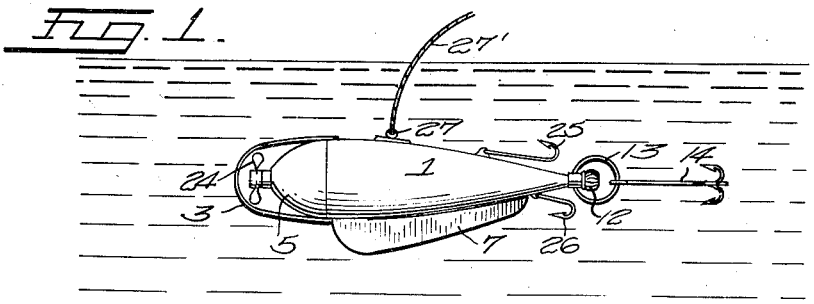
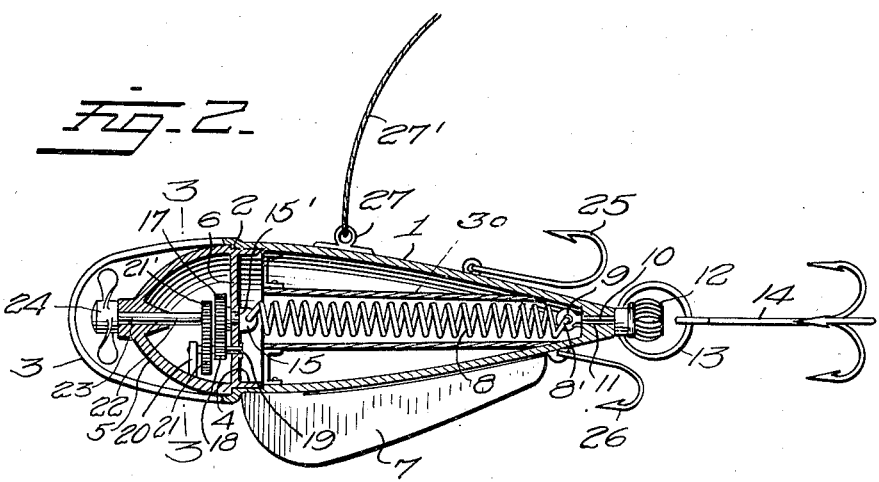
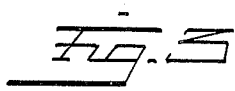
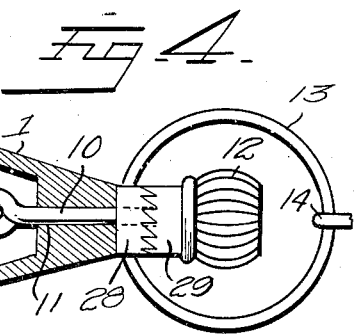
Inventor
C. E. McEWEN
By
Attorney Patented Nov. 2, 1937

2,097,986

UNITED STATES PATENT OFFICE 2,097,986

FISH LURE

Christopher E. McEwen, Nashville, Tenn.

Application October 19, 1936, Serial No. 106,433

2 Claims. (Cl. 43—43)

My invention relates to improvements in fish lures, and refers particularly to a fish lure for use in trolling, and the main object of my invention is the provision of an article of this character which will be mechanically propelled through the water and enable the fisherman to troll from the shore, or from a suitable anchored craft, as may be found most convenient and desirable.

Another object of my invention is the provision of a fish lure having means for propelling the lure through the water at the desired speed to attract the fish and make the lure highly efficient and desirable for the purpose intended.

Another object of my invention is the provision of a mechanical motor operated fish lure or artificial bait, which will have the proper appearance to attract the fish, which will be of simple, strong and durable construction and not likely to get out of order, and which may be made at a price to make its use a necessity.

With these objects in view my invention consists of a fish lure of the character stated embodying novel features of construction and combination of parts, substantially as described and claimed and as shown in the accompanying drawing, in which:

Figure 1 represents a side view of the fish lure constructed in accordance with and embodying my invention shown in the water in operating position.

Figure 2 represents a central longitudinal sectional view of the fish lure on an enlarged scale.

Figure 3 represents a sectional view taken on line 3—3 of Figure 2, and

Figure 4 represents a detail view of a modification of my invention.

In general outline the fish lure constructed in accordance with my invention is of oval or torpedo shape, and comprises the body portion 1, which has the open forward end 2, from which extends the yoke or guard 3, and fitting in said open end is the flange or rim 4 of the nose portion 5, which nose portion is also formed with the vertical wall 6, and the main body portion is formed with or carries the fin 7, providing a guide or rudder for the lure.

Arranged longitudinally in the body portion and extending the length of said portion is the coiled spring 8, whose outer end 8', is connected to the eye 9, on the stud 10, which passes through an opening 11, in the end of the body and is secured to the winding head 12, said head being enclosed by the ring 13, to which is loosely connected the snag hook element 14.

The inner end of said spring 8, is connected to the lug 15, on the stud 15', which is journalled in an opening of the wall 6, of the nose portion, and upon the outer end of said stud is mounted a gear wheel 17, which meshes with a gear wheel 18, on the shaft 19, which shaft is journalled in the wall 6 and bracket 20, and said gear wheel 18, on shaft 19, is disposed in parallel relation to the gear wheel 21, on shaft 18, and is in mesh with gear wheel 21' on shaft 22, bearing in an opening 23, in the nose portion 5, and said shaft 22 carries the propeller 24, all as most clearly shown in Figure 2.

Also freely connected to the body portion of the fish lure are the snag hooks 25 and 26, and upon the upper portion of the body is secured an eye 27, to which is attached the line 27', which line leads from the lure to the shore or an anchored craft and is held in the hand of the fisherman, and in use the coiled spring is wound tight and the lure in this condition is cast in the water and as the spring unwinds the rotary action of the spring through the train of gearing revolves the propeller and causes the lure to travel along after the manner of trolling and at the desired speed to insure the efficient operation of the device.

It will be apparent that the lure can be used by the fisherman from a stationary position, as upon the shore or in a boat when anchored and that the trolling action is effected and the train of gears acts to hold the spring from unwinding too rapidly, causing the lure to travel a long distance after each winding of the spring.

It will be noted that the lure has the appearance and shape of a fish and can be made of any desired size and of any suitable material and colored as required and generally the fish lure will prove useful, desirable and practical.

In Figure 4 is shown a ratchet or toothed structure to prevent the spring from unwinding too rapidly which comprises the rigid toothed member 28, and the rotating toothed member 29, on the stem or stud 10, while to prevent the spring 8, from twisting or buckling the enclosing tube 30, is provided.

I claim:

1. A fish lure comprising a body portion, hooks carried by said body portion at desired points, and means within the body portion for propelling the body portion through the water, said means for propelling the body portion comprising a propelling mechanism in one end of the body, a winding mechanism in the other end of said body and a coiled spring having one end connected to the winding mechanism and its other end connected to said propeller driving mechanism.

2. A fish lure comprising a body portion, hooks carried by said body portion, a casting line leading from said body portion, a coiled spring arranged in said body portion, a winding stud connected with one end of the said spring to wind the spring, a train of gearing operated from the other end of said spring, a propeller shaft carrying a propeller at its outer end, a gear wheel at the inner end of said propeller shaft and a meshing gear for driving said gear on the propeller shaft.

CHRISTOPHER E. McEWEN.